US008862400B2

(12) United States Patent
Kelly

(10) Patent No.: US 8,862,400 B2
(45) Date of Patent: Oct. 14, 2014

(54) METHODS AND SYSTEMS OF NETWORK-BASED INDOOR LOCATION ESTIMATION USING MULTIPLE WI-FI ACCESS POINTS

(71) Applicant: MCube, Incorporated, San Jose, CA (US)

(72) Inventor: Joe Kelly, Center Point, IA (US)

(73) Assignee: mCube Inc., San Jose, CA (US)

( * ) Notice: Subject to any disclaimer, the term of this patent is extended or adjusted under 35 U.S.C. 154(b) by 0 days.

(21) Appl. No.: 13/776,525

(22) Filed: Feb. 25, 2013

(65) Prior Publication Data

US 2014/0074399 A1    Mar. 13, 2014

Related U.S. Application Data

(60) Provisional application No. 61/603,229, filed on Feb. 24, 2012.

(51) Int. Cl.
*G01S 5/02* (2010.01)
*G01C 21/00* (2006.01)
*H04W 4/02* (2009.01)
*G06Q 30/02* (2012.01)
*G01S 5/14* (2006.01)

(52) U.S. Cl.
CPC ............... *G01C 21/00* (2013.01); *H04W 4/02* (2013.01); *G06Q 30/0201* (2013.01); *G01S 5/14* (2013.01); *G01S 5/0284* (2013.01); *G01S 5/0252* (2013.01)
USPC ......... 701/522; 701/300; 701/526; 455/456.5

(58) Field of Classification Search
CPC ...... G01S 5/0036; G01S 5/0252; H04W 4/02; H04W 64/00; G06Q 30/0201
See application file for complete search history.

(56) References Cited

U.S. PATENT DOCUMENTS

| | | | |
|---|---|---|---|
| 8,350,758 B1 * | 1/2013 | Parvizi et al. ................. | 342/452 |
| 8,594,680 B2 * | 11/2013 | Ledlie et al. .................. | 455/445 |
| 2005/0096068 A1 * | 5/2005 | Bahl et al. .................... | 455/456.1 |
| 2006/0046709 A1 * | 3/2006 | Krumm et al. ............. | 455/422.1 |
| 2007/0178911 A1 * | 8/2007 | Baumeister et al. ....... | 455/456.1 |
| 2009/0247186 A1 * | 10/2009 | Ji et al. ........................ | 455/456.1 |
| 2012/0058733 A1 * | 3/2012 | Jovicic et al. .............. | 455/67.11 |
| 2012/0316938 A1 * | 12/2012 | Moshfeghi ................. | 705/14.16 |

* cited by examiner

*Primary Examiner* — Michael J Zanelli
(74) *Attorney, Agent, or Firm* — Kilpatrick Townsend and Stockton LLP

(57) ABSTRACT

A computer-implemented method and system for determining navigation/positional data, implemented in a computing system programmed to perform the method. The method includes receiving a plurality of signal strength measurements and user ID data from a hand-held user device, determining user navigation/position data using the plurality of signal strength measurements from the hand-held user device, and transferring the user navigation/position data to the hand-held user device in response to a request signal associated with the user ID data. The user navigation/position data can include 2-D position, 3-D position, relative position, heading, orientation, speed, bearing, and the like. Benefits of this method and system include user hardware independence, reduced computational load on user hardware, and network-level tracking of aggregated traffic patterns.

17 Claims, 3 Drawing Sheets

METHODS AND SYSTEMS OF NETWORK-BASED INDOOR LOCATION ESTIMATION USING MULTIPLE WI-FI ACCESS POINTS

CROSS-REFERENCES TO RELATED APPLICATIONS

The present application claims priority to and incorporates by reference, for all purposes, the following patent application: U.S. Provisional App. No. 61/603,229, filed Feb. 24, 2012. The present application also incorporates by reference the following patent applications: U.S. patent application Ser. No. 13/758,707, filed Feb. 4, 2013, and U.S. patent application Ser. No. 13/758,486, filed Feb. 4, 2013.

BACKGROUND OF THE INVENTION

The present invention relates to portable device navigation/positioning methods and systems. More specifically, embodiments of the present invention relate to methods for using global positioning system data, physical-based inertial data, and/or wireless signals for navigation/positioning purposes.

The use of navigational tools within portable handheld devices has been widespread in contemporary society. The ability to quickly and accurately determine a user's location and heading toward a desired destination is highly desirable. Conventional tools for navigation have included systems that implement GPS or other Radio-Frequency based positioning methods. However, these methods require frequent updating to remain accurate. As GPS and other Radio-Frequency based positioning become either degraded or completely unavailable, systems that utilize these methods are rendered useless.

From the above, it is seen that techniques for improving operation of navigational systems and methods are highly desired.

BRIEF SUMMARY OF THE INVENTION

The present invention relates to portable device navigation/positioning methods and systems. More specifically, embodiments of the present invention relate to methods for using global positioning system data, physical-based inertial data, and/or wireless signals for navigation/positioning purposes and systems thereof. These systems can include integrated MEMS (Microelectromechanical System) devices and related structures, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention provide a computer-implemented method for determining navigation/positional data, implemented in a computing system programmed to perform the method. The method can include receiving in the computing system, a plurality of signal strength measurements and user ID data from a hand-held user device, each of the plurality of signal strength measurements being associated with one of a plurality of access points. The receiving can occur over a wired or wireless interface. The user ID data can include a user SSID (Service Set Identifier) and MAC (Media Access Control) address.

The method can include determining in the computing system, user navigation/position data using the plurality of signal strength measurements from the hand-held user device, the user navigation/position data being associated with the user ID data from the hand-held user device. The determining can include estimating a range based on the signal strengths or matching the signal strengths to a reference database configured by reference signal strengths during system installation. The user navigation/position data can include 2-D position, 3-D position, position relative to known landmarks, position relative to a map, traffic relative to position, items of interest relative to position, heading, orientation, speed, or bearing, or the like.

And, the method can include transferring by the computing system, the user navigation/position data to the hand-held user device in response to the hand-held user device sending a request signal associated with the user ID data. Also, user metric data can be determined from the plurality of signal strength measurements and stored in a user metric database for applications such as marketing analysis, memory management, target advertisements, and the like and combinations thereof. Furthermore, a system comprising physical sensors and a processor configured with a memory to perform these method steps is provided.

Many benefits are achieved by the way of the present invention over conventional techniques. Hardware variations among user devices become less of a concern and hardware consistency for multiple strength measurements can be guaranteed in order to assure best possible positioning accuracy. Computational resources of the user device will not factor in to navigational accuracy, and a retailer or other location owner will be able to assure a minimum level of performance for all compliant users. Also, aggregated traffic patterns within a store can be tracked at the network level and used to vet map accuracy without large-scale "crowd-sourcing" or a meticulous survey/check procedure.

Various additional features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
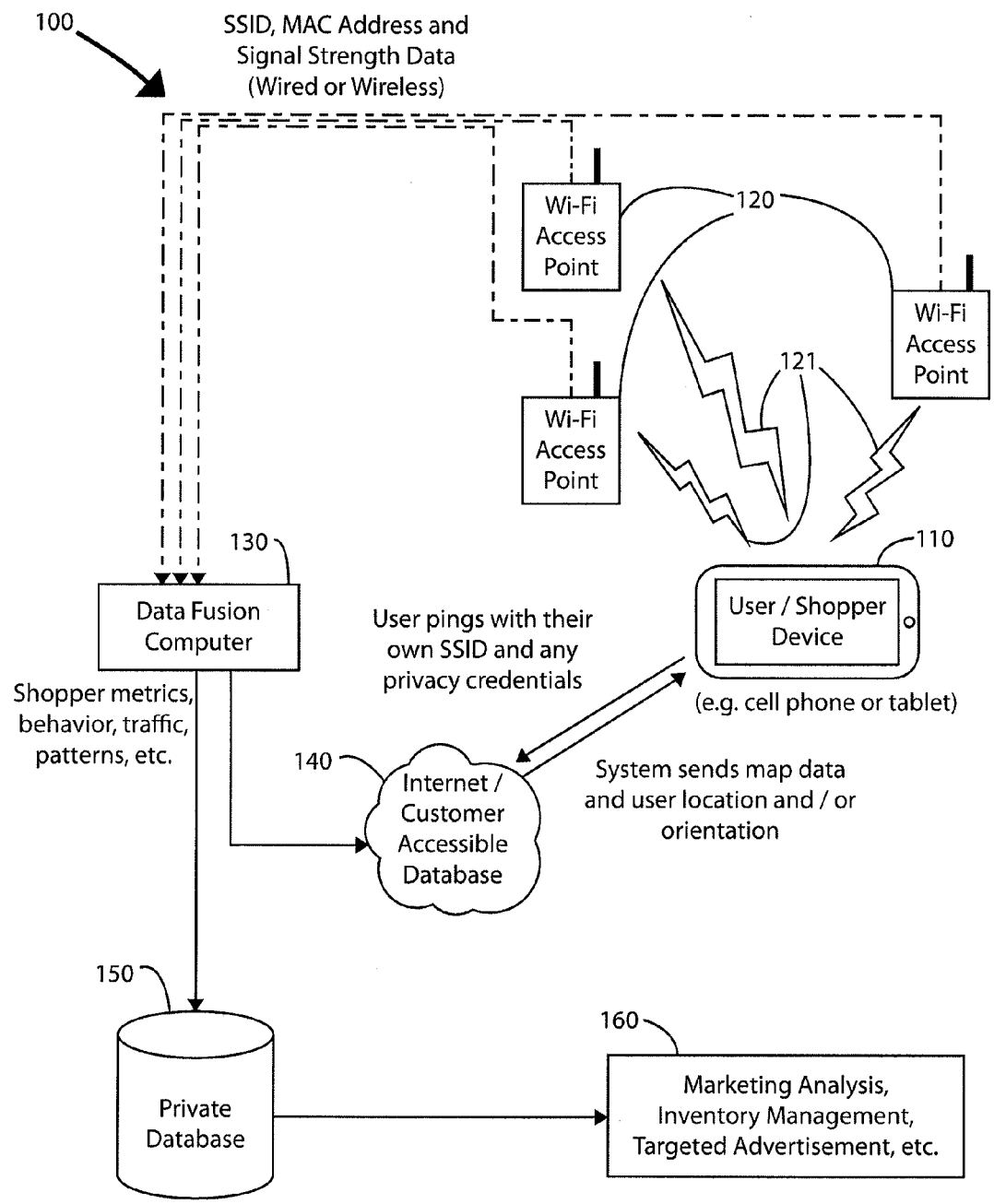
FIG. 1 is a simplified block diagram of a navigational/positional system according to an embodiment of the present invention.

The present invention relates to portable device navigation/positioning methods and systems. More specifically, embodiments of the present invention relate to methods for using global positioning system data, physical-based inertial data, and/or wireless signals for navigation/positioning purposes and systems thereof. These systems can include integrated MEMS devices and related structures, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Development in the area of indoor positioning technology has primarily focused on the efficient fusion of data from multiple sensors, devices, and data bases available to a user on a smartphone, mobile device, or the like. Wi-Fi-based position estimation techniques have been developed that use signal strength measurements along with unique identification information and location data for a number of visible Wi-Fi Access Points to determine the location of the user equipment through either modeling of the radio-frequency (RF) propagation properties between Access Points and the user, or by matching the location-specific Wi-Fi strength signature via a correlation process or database search. These methods can be complex, and often demand ample computational resources to perform adequately.

For most mobile devices, both battery capacity and physical computing capabilities are extremely limited, and thus it would be convenient to offload this type of processing where possible. Further adding to the problem from a mobile user's standpoint is that navigation computations on user equipment typically have to be designed to work in a multitude of environments, for example shopping malls, parking garages, warehouses, and office buildings, and the like. Each of these types of environments has its own characteristics that require special provisions in order to optimize location determination processing.

Embodiments of the present invention seek to solve both of these problems by allowing the owner of a facility to determine the accuracy, algorithm sophistication, availability, and other design aspects that best suit its needs and the needs of its clientele. This is done by reversing the navigation problem such that the strength measurements of the Wi-Fi signal from the user are taken at each Access Point, and these data, along with identifying information for a user's device, are communicated back to a central processing resource, either over a conventional wired interface or using the wireless link from the Access Point itself. This latter option effectively turns each Access Point into a simple repeater, and allows the most installation flexibility provided each of these devices can make strength measurements on the signal it is receiving from one or multiple users. Once all of the data are collected at the central processing resource, a navigation solution can be formed, which may include but is not limited to: two-dimensional position, three-dimensional position, position relative to known landmarks or map features, heading, orientations, speed, bearing, and the like.

FIG. 1 illustrates a simplified block diagram of a network-based user navigational/positional system according to an embodiment of the present invention. System 100 shows an example of an architecture employing the approach described previously, and includes potential consumers of the navigational/positioning data once they are computed.

The processing of the navigation solution itself can occur in multiple ways. The simplest would be to convert each strength measurement into an estimate of range, possibly corrected with models of RF propagation effects, and the like, to achieve greater accuracy. A more complex approach that truly leverages the strength of the network-based solution would be for the received signal strengths to be matched against a database that is constructed from signal strength measurements received during system installation, and either periodically or continuously updated based on measurements from users of the operational system. This procedure is an inverse of the previously developed technique of "Wi-Fi fingerprinting" where a user matches signal strengths from numerous received Access Points to attempt to determine his or her location on the mobile device, but relieves the user of having to maintain the database or perform computationally intensive processing to maintain navigation accuracy.

Navigational information can then be linked back to each user via the internet to provide guidance through the facility, provide situational awareness for areas of congestion, events and items of interesting, nearest sales personnel, etc. Information can also be collected locally and aggregated to improve system performance, and to support other analysis of user/consumer behavior.

As shown, system 100 shows a user device 110 receiving signal strength measurements 121 from multiple Wi-Fi sources 120. These Wi-Fi sources 120 can communicate with a Data Fusion Computer 130, which can be any time of computing device, central processing system, and the like. The data communicated in a wired or wireless manner to the Computer 130 can include SSID, MAC address, signal strength data, and the like. This data can be processed to determine location or orientation data associated, which can be accessible from a Customer Database 140. The user of device 110 can ping their own SSID and any privacy credential to the Database 140 to receive the map data, user location, and/or user orientation.

In an embodiment, the present invention provide a computer-implemented method for determining navigation/positional data, implemented in a computing system programmed to perform the method. The method can include receiving in the computer system, a plurality of signal strength measurements and user ID data from a hand-held user device, each of the plurality of signal strength measurements being associated with one of a plurality of access points. The receiving can occur over a wired or wireless interface. The user ID data can include a user SSID and MAC address.

The method can include determining in the computer system, user navigation/position data using the plurality of signal strength measurements from the hand-held user device, the user navigation/position data being associated with the user ID data from the hand-held user device. The determining can include estimating a range based on the signal strengths or matching the signal strengths to a reference database configured by reference signal strengths during system installation. The user navigation/position data can include 2-D position, 3-D position, position relative to known landmarks, position relative to a map, traffic relative to position, items of interest relative to position, heading, orientation, speed, or bearing, or the like.

And, the method can include transferring by the computing system, the user navigation/position data to the hand-held user device in response to the hand-held user device sending a request signal associated with the user ID data. Also, user metric data can be determined from the plurality of signal strength measurements and stored in a user metric database for applications such as marketing analysis, memory management, target advertisements, and the like and combinations thereof. Furthermore, a system comprising physical sensors and a processor configured with a memory to perform these method steps is provided.

Additionally, the data collected and processed at the Computer 130 can include shopper metrics, shopper behavior, traffic, various patterns, and the like. These can be provided to Private Database 150, which can be connected to various applications 160, such as marketing analysis, inventory management, targeted advertisement, and the like.

Some embodiments are related to dead-reckoning navigation technology similar to that described in references incorporated herein. This class of technology requires initialization and periodic resetting of the position solution in order to keep errors at an acceptable level. Some embodiments of Wi-Fi based positioning techniques can provide this capability in the absence of more accurate Global Positioning Systems (GPS) service, but may require active access to certain features of a user handset. In addition, some embodiments of indoor navigation technology can allow retailers to have tighter control over their customers' experience with location-specific applications.

This approach essentially inverts the process of "Wi-Fi Fingerprinting", described in references incorporated herein, where a user computer attempts to match received signal strengths from multiple Access Points in order to uniquely determine his or her position. By making strength measurements at the Access Point and performing navigation computations at the network level, one or more of the following benefits can be achieved:

- Hardware variations among user devices become less of a concern and hardware consistency for multiple strength measurements can be guaranteed in order to assure best possible positioning accuracy.
- Computational resources of the user device will not factor in to navigational accuracy, and a retailer or other location owner will be able to assure a minimum level of performance for all compliant users.
- Aggregated traffic patterns within a store can be tracked at the network level and used to vet map accuracy without large-scale "crowd-sourcing" or a meticulous survey/check procedure.

In an example, the present invention provides a computer-implemented method to determine navigation/position data in a computing system programmed to perform the method, as outlined below.

1. Receive a plurality of Wi-Fi signals from a plurality of access points in a hand-held user device;
2. Determine the signal strength measurements for each of the Wi-Fi signals;
3. Transfer the plurality of signal strength measurements and user ID data to the computing system;
4. Determine the user navigation/position data using the signal strength measurements of the hand-held user device;
5. Store the navigation/position data in a user-accessible database;
6. Receive a user request from the hand-held user device associated with the user ID data;
7. Transfer the user navigation/position data to the hand-held user device;
8. Determine user metric data from the signal strength measurements;
9. Store the user metrics data in a user metrics database; and
10. Perform other steps, as desired.

As shown, the present method has a sequence of steps, which can be varied, modified, replaced, reordered, expanded, contracted, or any combinations thereof. That is, the method repeats any of the above steps. Such steps may be performed alone or in combination with others, which are described or not even described. The steps can be performed in the order shown or in other orders, if desired. The steps also can be performed using a combination of hardware and software using other process steps. The steps also can be performed using hardware or other processes implemented using software and the like. Of course, there can be many other variations, modifications, and alternatives. Further details of the present method can be found throughout the present specification and more particularly below.

Figure 2:
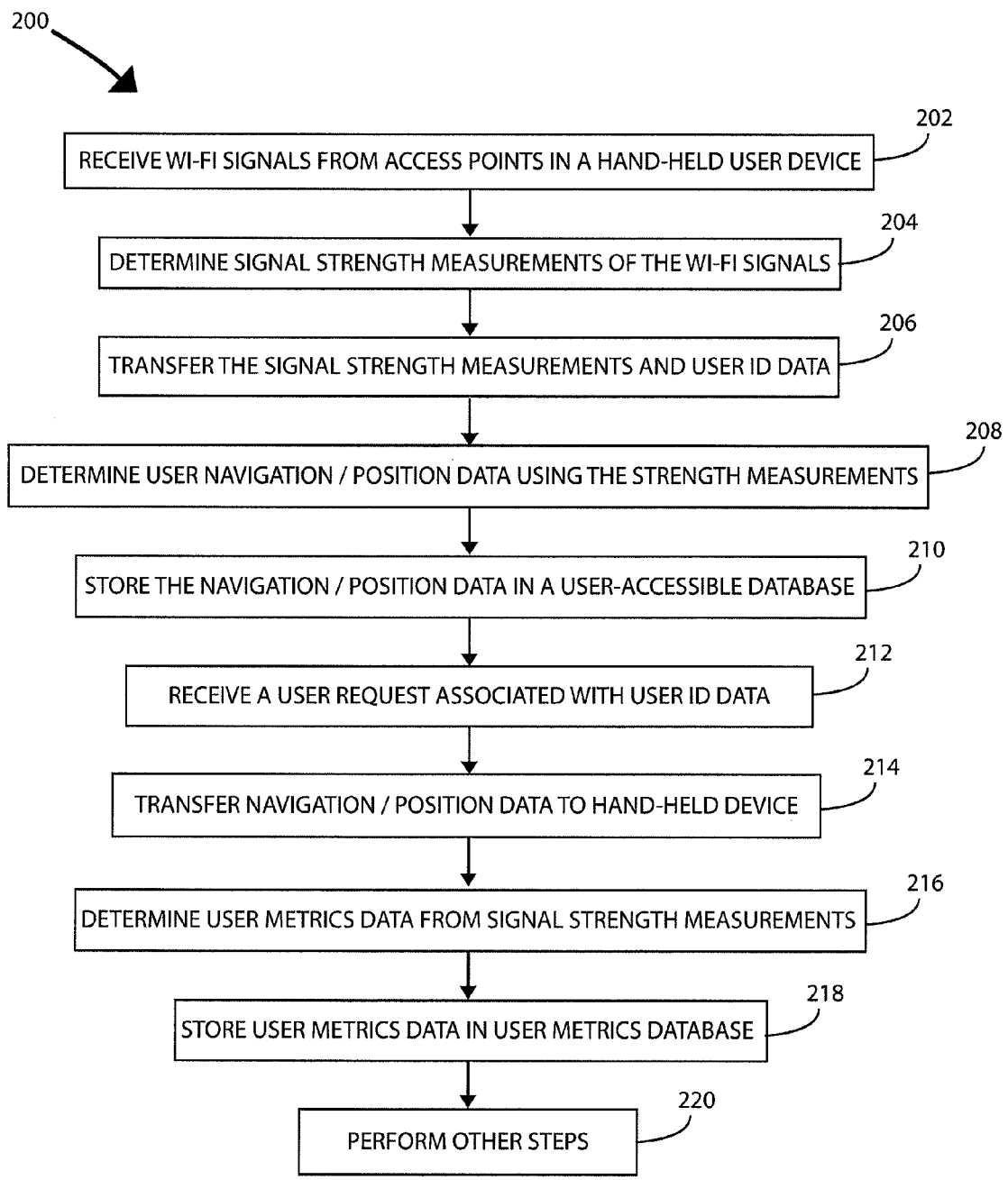
FIG. 2 is a simplified flow diagram of a method for operating a navigational/positional system according to an embodiment of the present invention.

FIG. 2 illustrates a simplified flow diagram of a method for operating a navigational system according to an embodiment of the present invention. As shown, method 200 can include receiving, in a hand-held user device, a plurality of Wi-Fi signals from a plurality of Wi-Fi access points, step 202. Each of the plurality of Wi-Fi signals can be associated with one of the plurality of Wi-Fi access points. A plurality of signal strength measurements can be determined in the hand-held user device, step 204, where each of the plurality of signal strength measurements are associated with one of the plurality of Wi-Fi access points. The plurality of signal strength measurements and user ID data can be transferred from the hand-held user device to the computing system, step 206. The user ID data can include a user SSID and MAC address.

User navigation/position data can be determined by the computing system, step 208. The user navigation/position data can be associated with the user ID data. The data can include 2-D position, 3-D position, position relative to known landmarks, position relative to a map, traffic relative to position, items of interest relative to position, heading, orientation, speed, or bearing, and the like and combinations thereof. Methods of determining the data can include determining an estimate of range based on the plurality of signal strength measurements, or matching the plurality of signal strength measurements to a reference database configured by a plurality of reference signal strength measurements received during system installation. This data can be stored in a user-accessible database coupled to the computing system, step 210. The data in the database being associated with the user ID data.

A user request can be received from the hand-held user device, step 212. This user request can be associated with the user ID data, such as an SSID and a MAC address. The computing system can then transfer the user navigation/position data from the user-accessible database to the hand-held user device in response to the user request associated with the user ID data, 214. The method 200 can further include determining user metrics data associated with the plurality of signal strength measurements, step 216, and storing these data in a user metrics database, step 218, for applications such as marketing analysis, memory management, and targeted advertisement, and the like. Other steps can then be performed as desired, step 220.

Figure 3:
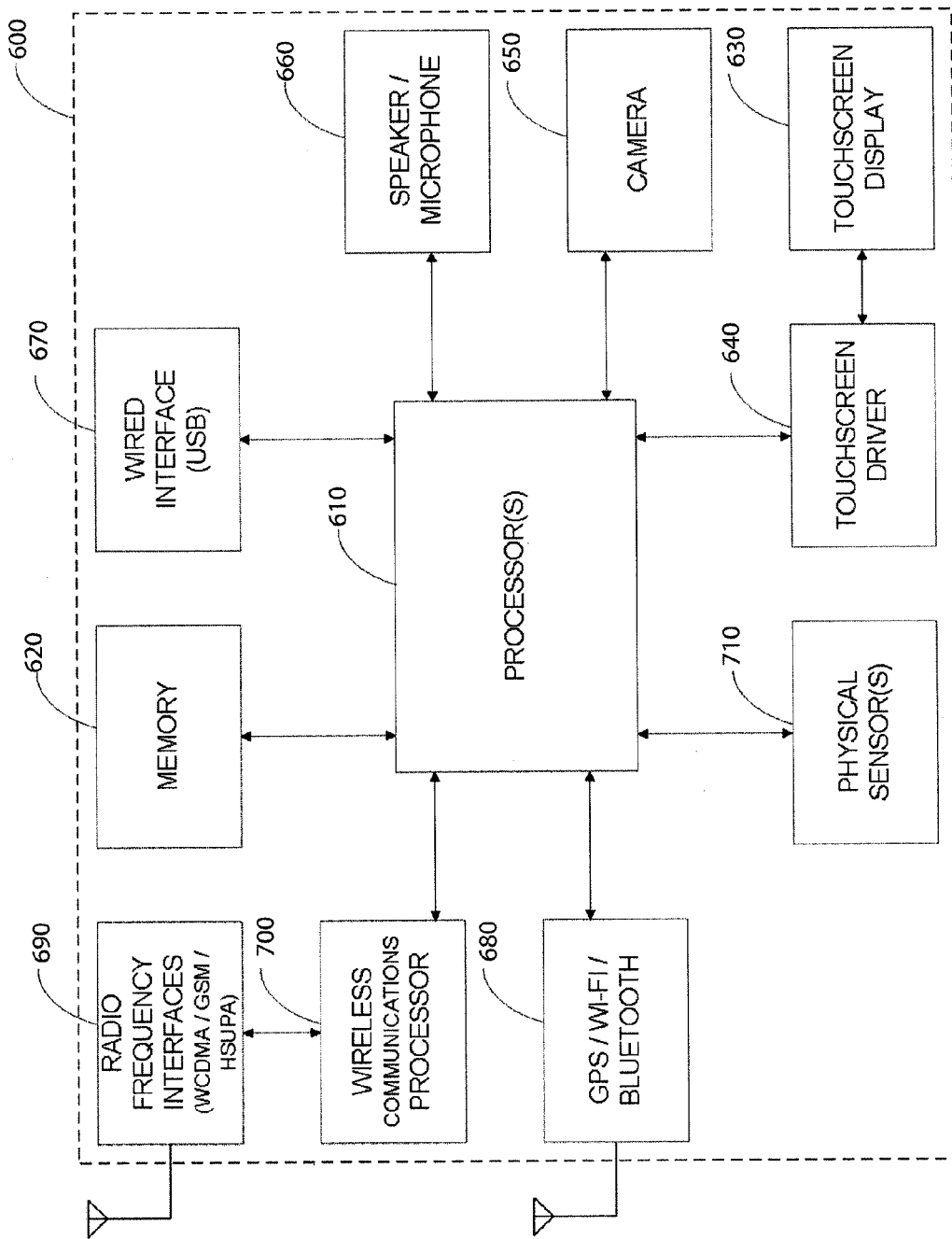
FIG. 3 illustrates a simplified functional block diagram of various embodiments of the present invention.

FIG. 3 illustrates a functional block diagram of various embodiments of the present invention. In FIG. 3, a computing device 600 typically includes an applications processor 610, memory 620, a touch screen display 630 and driver 640, an image acquisition device 650, audio input/output devices 660, and the like. Additional communications from and to computing device are typically provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 600 may include one or more processors 610. Such processors 610 may also be termed application processors, and may include a processor core, a video/graphics core, and other cores. Processors 610 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 630 and driver 640 may be based upon a variety of later-developed or current touch screen technology including resistive displays, capacitive displays, optical sensor displays, electromagnetic resonance, or the like. Additionally, touch screen display 630 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 650 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 660 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 3, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 3, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, these functionality are provided upon a single IC package, for example the Marvel PXA330 processor, and the like. It is contemplated that some embodiments of computing device 600 need not include the RF functionality provided by RF interface 690 and driver 700.

FIG. 3 also illustrates computing device 600 to include physical sensors 710. In various embodiments of the present invention, physical sensors 710 can be single axis or multi-axis Micro-Electro-Mechanical Systems (MEMS) based devices being developed by M-cube, the assignee of the present patent application. Physical sensors 710 can include accelerometers, gyroscopes, pressure sensors, magnetic field sensors, bio sensors, and the like. In other embodiments of the present invention, conventional physical sensors 710 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 630 and driver 640 and inputs/or outputs to physical sensors 710 may be processed in parallel processing threads. In other embodiments, such events or outputs may be processed serially, or the like. Inputs and outputs from other functional blocks may also be processed in parallel or serially, in other embodiments of the present invention, such as image acquisition device 650 and physical sensors 710.

FIG. 3 is representative of one computing or micro-processing device 600 capable of embodying the present invention. In one embodiment, the DOC can be implanted on chip with sensors instead of using an external processor. The previously described methods of operation can be implemented with on-chip logic or through a micro-processor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 600 may lack image acquisition unit 650, or RF interface 690 and/or driver 700, or GPS capability, or the like. Additional functions may also be added to various embodiments of computing device 600, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for determining navigation/positional data, implemented in a computing system programmed to perform the method comprising:
   receiving in the computer system, a plurality of signal strength measurements and user ID data from a hand-held user device, each of the plurality of signal strength measurements being associated with one of a plurality of access points;
   determining in the computer system, user navigation/position data using the plurality of signal strength measurements from the hand-held user device, the user navigation/position data being associated with the user ID data from the hand-held user device; and
   transferring by the computing system, the user navigation/position data to the hand-held user device in response to the hand-held user device sending a request signal associated with the user ID data; and
      determining by the computing system, user metrics data associated with the plurality of signal strength measurements; and
      storing by the computing system, the user metrics data in a user metric database for applications selected from a group consisting of: marketing analysis, memory management, and targeted advertisement.

2. The method of claim 1 wherein the receiving of the plurality of signal strength measurements and user ID data occurs over a wired or wireless interface.

3. The method of claim 1 wherein the user ID data includes a user SSID and MAC address.

4. The method of claim 1 wherein the user navigation/position data includes 2-D position, 3-D position, position relative to known landmarks, position relative to a map, traffic relative to position, items of interest relative to position, heading, orientation, speed, or bearing.

5. The method of claim 1 wherein the determining of the user navigation/position data comprises
   determining an estimate of range based on the plurality of signal strength measurements, or
   matching the plurality of signal strength measurements to a reference database configured by a plurality of reference signal strength measurements received during system installation.

6. A computer-implemented method for determining navigation/positional data, implemented in a computing system programmed to perform the method comprising:
   receiving in a hand-held user device, a plurality of Wi-Fi signals from a plurality of Wi-Fi access points, each of the plurality of Wi-Fi signals being associated with one of the plurality of Wi-Fi access points;
   determining in the hand-held user device, a plurality of signal strength measurements, each of the signal strength measurements being associated with one of the plurality of Wi-Fi signals;
   transferring by the hand-held user device, the plurality of strength measurements and user ID data to the computing system;
   determining by the computing system, user navigation/position data using the plurality of strength measurements, the user navigation/position data being associated with the user ID data;
   storing in a user-accessible database coupled to the computing system, the user navigation/position data associated with the user ID data;
   receiving in the computing system, a user request from the hand-held user device, the user request being associated with the user ID data;
   transferring by the computing system, the user navigation/position data from the user-accessible database to the hand-held user device in response to the user request associated with the user ID data determining by the computing system, user metrics data associated with the plurality of signal strength measurements; and
   storing by the computing system, the user metrics data in a user metric database for applications selected from a group consisting of: marketing analysis, memory management, and targeted advertisement.

7. The method of claim 6 wherein the transferring of the plurality of signal strength measurements and user ID data occurs over a wired or wireless interface.

8. The method of claim 6 wherein the user ID data includes a user SSID and MAC address.

9. The method of claim 6 wherein the user navigation/position data includes 2-D position, 3-D position, position relative to known landmarks, position relative to a map, traffic relative to position, items of interest relative to position, heading, orientation, speed, or bearing.

10. The method of claim 6 wherein the determining of the user navigation/position data comprises
    determining an estimate of range based on the plurality of signal strength measurements, or
    matching the plurality of signal strength measurements to a reference database configured by a plurality of reference signal strength measurements received during system installation.

11. The method of claim 10 wherein the reference database is updated using the plurality of signal strength measurements from a plurality of user devices.

12. The method of claim 10 wherein the user-accessible database comprises an internet-accessible consumer database configured to interface with the reference database and a plurality of user devices to provide location specific data.

13. A computing system specifically programmed by executable software code to determine user navigation/position data for a user, the computing system comprising:
    a physical sensor configured to determine a plurality of signal strength measurements in response to a plurality of signals from a plurality of access points;
    a memory configured to store executable software; and a processor coupled to the physical sensor and the memory, wherein the processor is programmed by the executable software to:

receive the plurality of signal strength measurements and user ID data from a hand-held user device, each of the plurality of signal strength measurements being associated with one of a plurality of access points, determine user navigation/position data using the plurality of signal strength measurements from the hand-held user device, the user navigation/position data being associated with the user ID data from the hand-held user device, and transfer the user navigation/position data to the hand-held user device in response to the hand-held user device sending a request signal associated with the user ID data;

wherein the processor is programmed to determine user metrics data associated with the plurality of signal strength measurements; and store the user metrics data in a user metric database for applications selected from a group consisting of: marketing analysis, memory management, and targeted advertisement.

14. The system of claim 13 wherein the processor is programmed to receive the plurality of signal strength measurements and user ID data over a wired or wireless interface.

15. The system of claim 13 wherein the processor is programmed to receive the user ID data including a user SSID and MAC address.

16. The system of claim 13 wherein the processor is programmed to determine the user navigation/position data including 2-D position, 3-D position, position relative to known landmarks, position relative to a map, traffic relative to position, items of interest relative to position, heading, orientation, speed, or bearing.

17. The system of claim 13 wherein the processor is programmed to determine the user navigation/position data by determining an estimate of range based on the plurality of signal strength measurements, or matching the plurality of signal strength measurements to a reference database configured by a plurality of reference signal strength measurements received during system installation.

* * * * *